United States Patent
Kasamatsu

[11] 3,932,086
[45] Jan. 13, 1976

[54] EXTRUDER

[76] Inventor: Tadashi Kasamatsu, 6-10, Shiratori 2-chome, Katsushikaku, Tokyo, Japan

[22] Filed: Nov. 6, 1974

[21] Appl. No.: 521,542

[30] Foreign Application Priority Data
Nov. 13, 1973 Japan.................... 48-130414[U]

[52] U.S. Cl. ............................................. 425/208
[51] Int. Cl.² ......................................... B29B 1/04
[58] Field of Search ............ 425/200, 202, 208, 209

[56] References Cited
UNITED STATES PATENTS

| | | | |
|---|---|---|---|
| 766,260 | 8/1904 | Jaques | 425/208 |
| 2,787,022 | 4/1957 | Chisholm | 425/208 X |
| 2,991,503 | 7/1961 | Rietz | 425/202 |
| 3,506,415 | 4/1970 | Paladino | 425/209 X |
| 3,596,320 | 8/1971 | Manning et al. | 425/200 X |
| 3,826,477 | 7/1974 | Kunogi et al. | 425/208 X |

FOREIGN PATENTS OR APPLICATIONS

| | | | |
|---|---|---|---|
| 953,310 | 3/1964 | United Kingdom | 425/202 |

*Primary Examiner*—Al Lawrence Smith
*Assistant Examiner*—James G. Smith
*Attorney, Agent, or Firm*—Armstrong, Nikaido & Wegner

[57] ABSTRACT

Improvement of a melting extruder in which a material is moved by the screw by providing a communicating path which permits reverse flow of the material in the passage throttle part in which the material is compressed.

8 Claims, 19 Drawing Figures

EXTRUDER

BACKGROUND OF THE INVENTION

The present invention relates to an apparatus which melts and extrudes synthetic resin materials.

Generally, synthetic resin compounds, prepared by mixing great quantities (for example, equivalent to a resin) of extenders such as gypsum or calcium carbonate in thermoplastic resin such as polyethylene, or polypropyrene are incombustible or produce less noxious gas even when these compounds burn and therefore the compounds are widely used as various types of molded products, packing materials and architectural materials. Furthermore, the resin can be saved by using the materials in this type of composition and the demands for these synthetic resin compounds will increase in the future.

In case of producing the pellets of synthetic resin compounds which are thus greatly extended, the thermoplastic resin and extenders should be kneaded while being melted and the mixture should be homogenized.

If the kneading efficiency of the extruder is low, great quantities of extender cannot be added, the compound cannot be homogenized and the producing speed becomes slow.

The principal object of the present invention is to provide an extruder capable of highly efficient kneading of the resin compounds, in view of the problems described above.

This principal object can be applied to the cases other than production of extended resin compounds. That is, it is applied to production of a compounded resin by mixing a plurality of different kinds of resin materials and production of bonding agents and paints by blending the resin and specific materials.

With respect to the bonding agents, since the conventional solvent-type, emulsion-type or water-soluble bonding agents provides its adhering force to objective materials through evaporation of a medium and drying and solidifying of the bonding agent, the industrial use of this type of the bonding agent is confronted with various problems such as the necessity of large-capacity drying equipment, deterioration of the productivity and environmental pollution and danger of fire due to production of a great volume of solvent vapor when the solvent type bonding agent is dried.

Instead of using bonding agents with the accompanying various problems, the hot-melt type bonding agents have recently been developed and their use is spreading.

This hot-melt type bonding agent is a solid bonding material containing no water or solvent and readily becomes a low-viscosity fluid when it is heated.

When this hot-melt type bonding agent is used, it is melted to a fluid by heating and applied to objective materials, and the materials are instantaneously bonded after spontaneous cooling.

Accordingly, the hot-melt type bonding agent requires a shorter time for the bonding work than other bonding agents for which the drying equipment is required, and this bonding agent is economical because the drying equipment is unnecessary and therefore provides high productivity and does not produce a solvent vapor as in case of a solvent type bonding agent. Thus it is forecast that the demands for the hot-melt type bonding agent will increase more and more in the future.

The blending of materials for the hot-melt type bonding agent can be varied in accordance with the applications. Generally it contains the base polymer (for example, EVA, polyethylene with low molecular weight, APP, polyisobutylene, styrenebutadiene, etc.) as the principal component, viscous resin (for example, rosin, terpene resins, petrochemical resins, cumarone, indene resins, etc.), various waxes and stabilizing agent.

As described above, a blended resin compound of an extremely low viscosity (viscosity: 100 ~ 100,000 cps) when it is melted as compared with general thermoplastic resins (usual viscosity: 1,000,000 cps or over) can be widely used for other applications such as, for example, coating, painting, printing, etc. in addition to the bonding applications, and the blended resin compounds can be integrally referred to as the hot-melt materials.

In general, hot-melt materials are supplied to users in the form of pellets, biscuits or small blocks; however, it is difficult to mold the hot-melt material by the extruders for general plastic materials for its specific characteristic, that is, extremely low viscosity when it is melted.

When an extruder for general plastic materials is used to extrude the hot-melt material, the molten hot-melt material has a small low friction with the internal surface of the extrusion cylinder, the hot-melt slips and the extrusion screw cannot perform conveying function of the hot-melt material.

Figure 16:
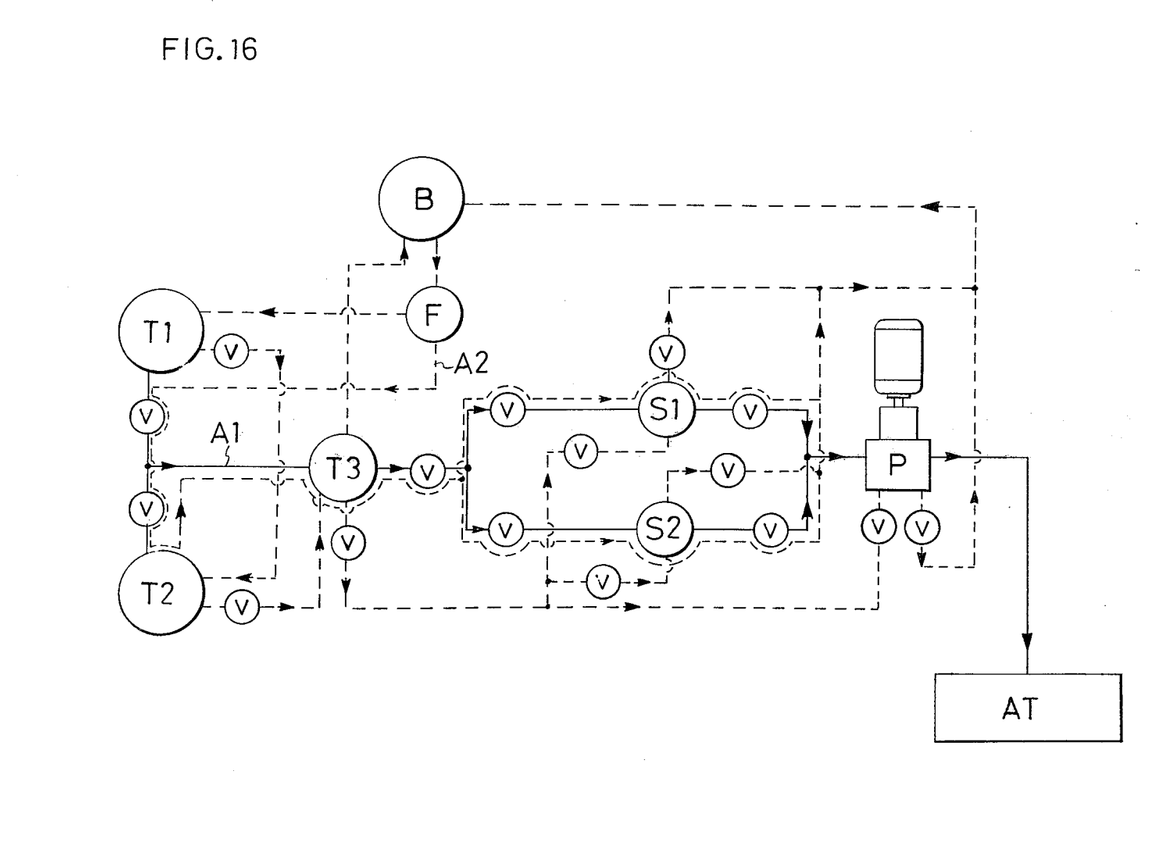
FIG. 16 is a block diagram of the conventional hot-melt material manufacturing plant.

Therefore, a complicated expensive plant as shown in FIG. 16 is operated for melting and processing the conventional hot-melt materials. In FIG. 16, raw materials of the hot-melt material are melted in the melting tank T1 and T2 and the molten hot-melt material is sent to the third tank T3 through the valves and the flow passage A1 shown with solid lines in the figure. In the third tank T3, the temperature of the molten material is adjusted and the mixing is more promoted. The first melting tank T1 and the second melting tank T2 are provided to perform continuously the operation by melting and stirring the material in one melting tank while the molten material is being discharged from the other tank. The molten material discharged from the third tank T3 is filtered by the strainer S1 or S2 and is sent under pressure to attachment AT such as the T dies by the pump P with internally rotating gears, whereby the molded products are obtained. In this case, strainers S1 and S2 are properly changed over in accordance with their filtering conditions.

In a plant like this, the melting tanks, strainers and pump should be heated to maintain the temperature of the molten material at a certain specified temperature. For this purpose, the heating medium boiler B and feeder F should be installed to form the pipe passage of the heating medium as shown with broken line A2 in the figure, flow passage A1 for the molten material should be made by dual piping and heated by said heating medium and many valves and cocks should be provided in the piping. In addition, the cooling water piping is required for the pump.

As described above, the conventional plants have been complicated and expensive in their constructions. In actual operation, these plants are disadvantageous in that it takes long until the material is melted and the hot-melt material should be completely discharged from all the pipings after extruding operation.

Furthermore, the pump type machines cannot process the hot-melt material of high viscosity (100,000 cps or over) for which the demands are expected to increase.

Another object of the present invention is to supply an extruder which is capable of extruding a hot-melt material as described above likewise general extruding machines and to vastly improve the efficiency and economy in melting and molding operations of the hot-melt material.

Further another object of the present invention is calrified in the detailed description of the construction based on the drawings.

SUMMARY

The extruder of the present comprising a cylinder which has the rear tubular part with large diameter, the front tubular part with small diameter and the tapered intermediate part between said front and rear tubular parts. The extruder is provided with the material supplying port for supplying the material at the periphery of the rear tubular part and the material extruding outlet for extruding the material at the front tubular part. A screw, which is provided with a spiral ridge on its periphery, is rotatably housed in said cylinder and has the rear part with large diameter, the front part with small diameter and the tapered intermediate part corresponding to said parts of said cylinder respectively. A material flow passage, which is formed by said spiral ridge between the external surface of said screw and the internal surface of said cylinder, communicates with said material supplying port and said material extruding outlet whereby the internal capacity per turn of said spiral ridge in a tapered throttle part formed by and between the tapered intermediate parts of said screw and cylinder decreases as the taper advances from the rear side to the front side. A rotary driving means rotates the screw and a heating means is provided on said cylinder to heat the material in said material flow passage. A material supplying means supplies the material to said material supplying port, for example, a kneading mechanism having rotary blades with edged ends to pulverize the material and to feed the pulverized material to said material supplying port, wherein the material reversely flows in reference to the direction of extrusion in said communicating path.

BRIEF DESCRIPTION OF DRAWINGS

The present invention is illustrated in detail by the accompanying drawings whereon:

FIG. 10c shows the groove of the cylinder matched with the groove of the screw and FIG. 10d shows that the both grooves are not aligned, FIG. 13 is a brief front view illustrating an equipment which produces laminated materials, using the extruder shown in FIG. 7, FIGS. 14 and 15 are partial cross sectional views illustrating another embodiment of the shapes of the screw and cylinder of the extruder according to the present invention.

DETAILED DESCRIPTION OF THE INVENTION

Figure 1:
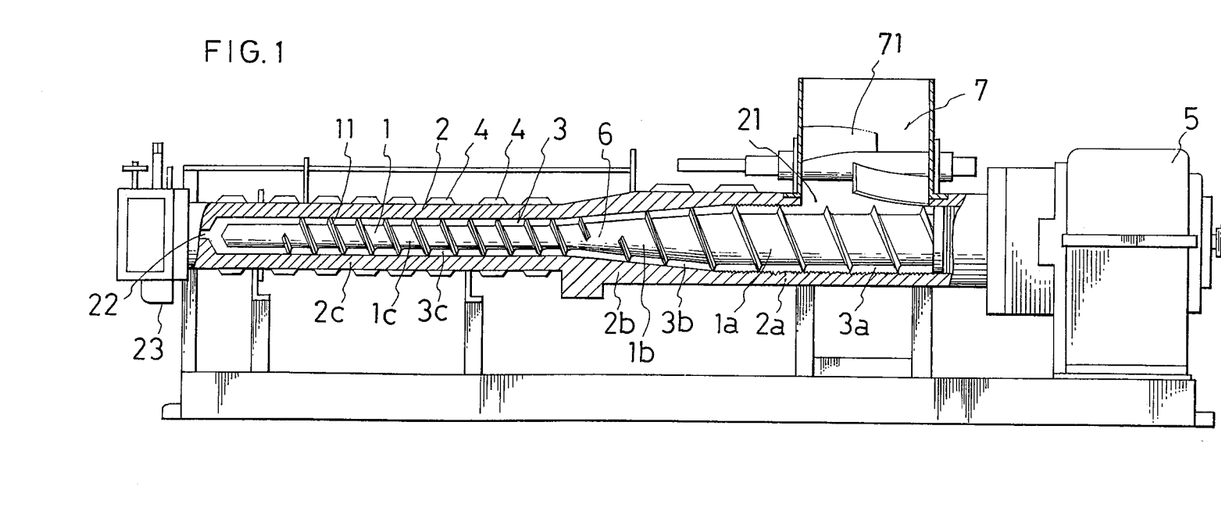
FIG. 1 is a front view with a partial cross section showing the overall construction of the extruder according to the present invention.

Referring to FIG. 1, there is shown an overall construction of the extruder according to the present invention.

Screw 1 provided with spiral ridge 11 on its periphery is rotatably housed in cylinder 2.

Said screw 1 comprises rear part 1a with a large diameter, front part 1c with a small diameter and tapered intermediate part 1b between said front and rear parts.

Said cylinder 2 comprises rear tubular part 2a with a large inside diameter, front tubular part 2c with a small inside diameter and tapered intermediate part 2b with a diameter which varies in accordance with the taper, whereby said cylinder fits the outmost contour of screw 1.

Material supplying port 21 for supplying materials is provided at the periphery of rear tubular part 2a of cylinder 2 and material extruding outlet 22 is provided at the front extreme end of front tubular part 2c of the cylinder. Nozzle 23 or a type of dies is mounted on outlet 22 in accordance with purposes or applications.

Material flow passage 3 is spirally formed by spiral ridge 11 of screw 1 between screw 1 and cylinder 2 and is communicated to said material supplying port 21 and material extruding outlet 22.

Heating means 4 is provided on the periphery of cylinder 2 to heat the material in material flow passage 3.

The rear end of screw 1 is connected to rotary driving mechanism 5 including a motor and gear mechanism to rotate said screw around the axis of the screw.

Said rotary driving mechanism is adapted to rotate screw 1 counterclockwise if spiral ridge 11 is provided in the direction of right thread and clockwise if said spiral ridge 11 is provided in the direction of left thread.

Accordingly, when screw 1 is rotated, a material fed from material supplying port 21 into material flow passage 3 is pushed to the left in the figure by spiral ridge 11, gradually melted by heating means 4 while being stirred and extruded from material extruding outlet 22.

The capacity per turn of the spiral ridge in rear passage part 3a formed by and between the front parts of cylinder 2 and screw 1 is smaller than that in front passage part 3c formed by and between the rear parts of cylinder 2 and screw 1 and the internal capacity per turn of the spiral ridge in passage throttle part 3b formed by and between the intermediate parts of cylinder 2 and screw 1 decreases as the passage advances from the rear part to the front part. Accordingly, the material fed from material supplying port 21 is compressed in passage throttle part 3b.

Figure 2:
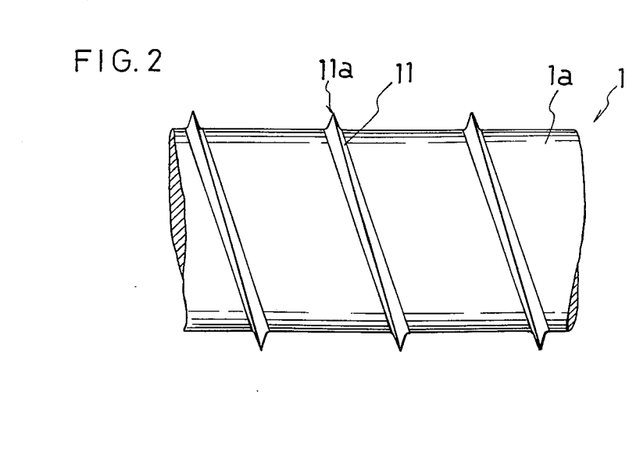
FIG. 2 is a magnified view showing the rear part of the screw of said extruder.

Top end 11a of the spiral ridge of rear part 1a of screw 1 is made in the form of cutting edge as shown in FIG. 2 and the internal surface of rear tubular part aa of cylinder 2 is knurled to be extremely coarse as compared with the outer periphery of screw 1.

Accordingly, the material fed from material supplying port 21 is engaged into material flow passage 3 by cutting edge type spiral ridge 11 and is smoothly forwarded by virtue of friction with the internal coarse surface of said cylinder since the material is prevented from being otherwise moved back due to friction with screw 1.

Though a material to be fed is of a lump type or a tacky and elastic type, it is cut into appropriate sizes by the cutting edge shaped spiral ridge and smoothly moved forward.

Passage throttle part 3b of material flow passage 3 is provided with at least one communicating path 6 which communicates the adjacent parts which are otherwise isolated by spiral ridge 11 in the material flow passage.

Communicating path 6 is formed by groove 61 made up by cutting away part of spiral ridge 11 in passage throttle part 3b.

Figure 3:
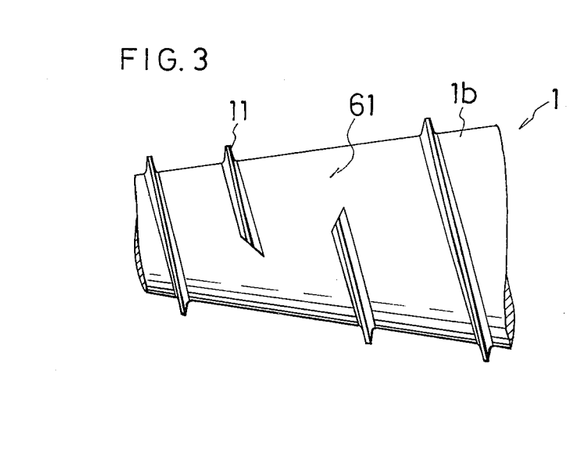
FIG. 3 is a magnified view showing the intermediate part of the screw of said extruder.
Figure 4:
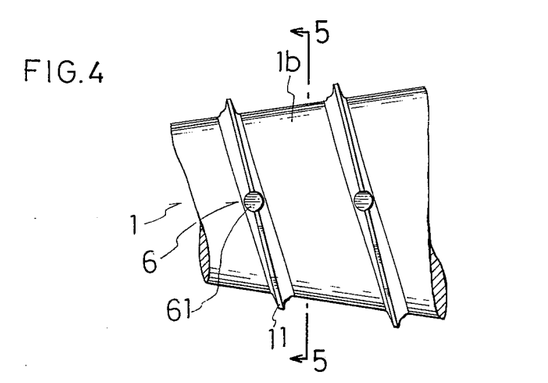
FIG. 4 is a magnified view showing another embodiment of the intermediate part of the screw of said extruder.
Figure 5:
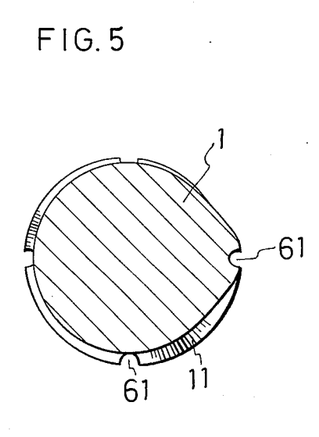
FIG. 5 is a cross section of the screw as viewed from line 5—5 in FIG. 4.
Figure 6:
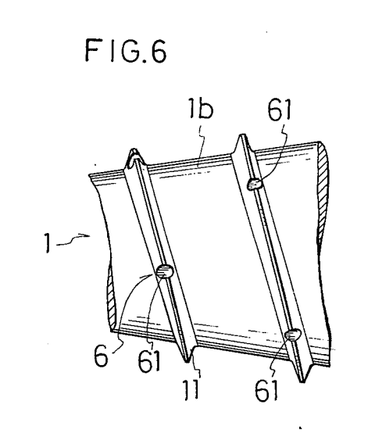
FIG. 6 is a magnified view showing another embodiment of the screw of said extruder.

Groove 61 is preferably made by omitting partly the spiral ridge as long as one-fourth to one turn around the screw as shown in FIG. 3 for producing synthetic resin compounds containing large quantities of extenders. Also, groove 61 can be made by chipping off in a small width the spiral ridge at a plural number of positions as shown in FIGS. 4, 5 and 6.

The material in passing through throttle part 3b is in a state of fluid due to heating and the capacity per turn of the spiral ridge of the material flow passage decreases as the spiral ridge advances from the rear side to the front side; accordingly, a fluid material is strongly compressed. Therefore, the material is usually saturated in front part 3c and is excessively pressurized and the excess of the fluid material is returned back through communicating path 6.

When the material at front part 3c side is insufficient, the pressure of front part 3c side becomes small and the material is filled in front part 3c through communicating path 6, and the equivalent amount of the material is sucked from rear part 3a side.

Thus, the fluid material is mixed and stirred and, at the same time, the quantity of material to be supplied to front part 3 is fixed.

In other words, the material to be extruded is homogenized by means of communicating path 6 and the extruding quantity of the material is fixed.

In the conventional machines which are not provided with communicating path 6, abnormally high pressure occurs around passage throttle part 3b to front part 3c and there is a fear of damaging the machines. However, in case of the extruder according to the present invention, excessive pressure can be avoided by virtue of the reverse flow effect of communicating path 6.

The air fed together with the material into material flow passage 3 when the material is fed and volatile substances produced from the material flow in reverse by providing communicating path 6 as described above, thus preventing the air and volatile gas from being contained in the material to be extruded.

When a number of thin grooves 61 are provided as communicating path 6, the grooves can be arranged so that the grooves provided adjacently in the spiral ridge may be aligned on the same line as shown in FIG. 4 or so that the grooves are not aligned in the same line as shown in FIG. 6, that is, the extension line of each groove is interrupted by the spiral ridge.

Particularly, in the embodiment shown in FIG. 1, kneading mechanism 7 is provided to pulverize the materials and feed the pulverized materials to material supplying port 21 of cylinder 2.

Kneading mechanism 7 comprises the rotary blade unit with blades 71 which are edged at their ends and rotary blades 71 are provided to be rotated by a rotating means (not shown) in reference to the axial line in parallel with screw 1.

The kneading mechanism pulverizes and mixes resin materials and extenders in the form of block when, for example, a great amount of extenders are to be added to a synthetic resin material, and the material and extenders are forced into material flow passage 3 of cylinder 2.

Accordingly, if kneading mechanism 7 is provided, various shapes of resin scraps can be fed into the material flow passage through the kneading mechanism and reused.

Needless to say, the kneading mechanism need not be provided, depending on the type of primary materials.

Figure 7:
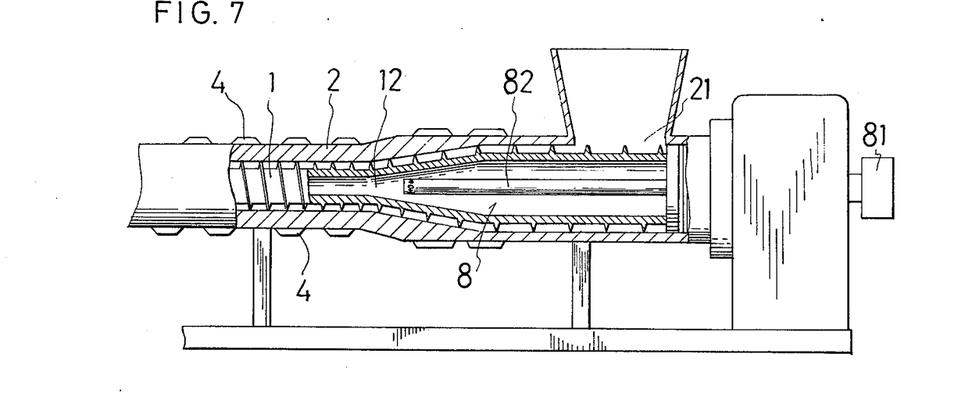
FIG. 7 is a partial cross sectional view to show the overall construction of another embodiment of the extruder according to the present invention.

Referring to FIG. 7, there is shown an embodiment of the extruder which is modified so that it can extrude a material, which has a low viscosity when it is melted, for example, a hot-melt material.

Though the basic configuration of cylinder 2, screw 1 and material flow passage 3 is the same as the embodiment shown in FIG. 1, screw 1 of the embodiment shown in FIG. 7 is provided with cooling mechanism 8 which cools the screw internally.

Cooling hole 12 is provided along the axial direction in screw 1.

Cooling hole 12 is provided so that its capacity decreases in the sequence of cooling hole rear part 12a corresponding to rear part 1a of screw 1, cooling hole intermediate part 12b corresponding to intermediate part 1b of screw 1 and cooling hole front part 12c corresponding to front part 1c of screw 1 and the cooling hole does not reach extreme front end 1c' of front part 1c of screw 1, that is, the part located nearest extruding outlet 22.

Cooling water pipe 82 to supply a cooling water through rotary joint 81 is inserted into cooling hole 12 from its rear side.

Said cooling water pipe 82 is arranged so that extreme end 82a of said cooling water pipe is positioned in tapered intermediate part 12b of the cooling hole and is closed, and a number of small holes 82b to supply the cooling water are provided at the outer periphery slightly behind said extreme end 82a.

Figure 8:
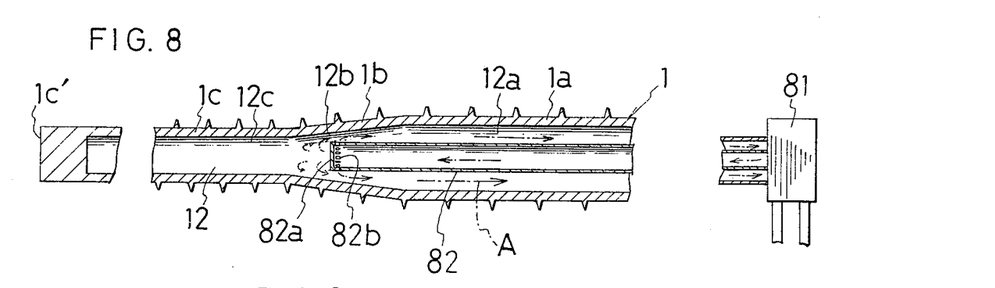
FIG. 8 is a cross sectional view of the screw employed in the extruder shown in FIG. 7, illustrating the flow of cooling water.

Accordingly, the cooling water is circulated through cooling water pipe 82 as shown with a dot-broken line in FIG. 8 and is not much circulated to cooling hole front part 12c. Therefore, the cooling efficiency of screw 1 is the highest at rear part 1a, followed by tapered intermediate part 1b and the lowest at front part 1c. Extreme front end 1c' of screw 1 is not nearly cooled.

Figure 9:
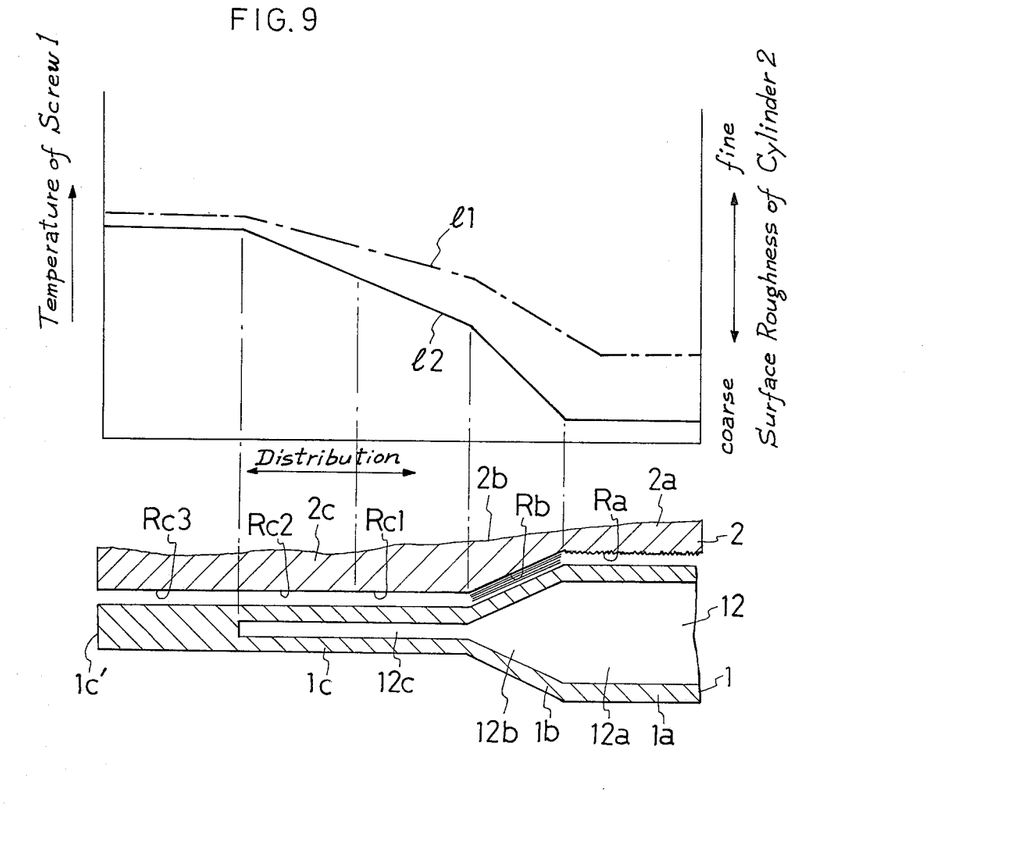
FIG. 9 is a graph showing the temperature distribution of the screw and the surface roughness of the internal surface of the cylinder, correspondingly drawn to the illustration of the cylinder and the screw.

Accordingly, the temperature distribution of screw 1 is expressed with line l1 in FIG. 9, and the temperature distribution of screw 1 gradually increases from the rear side to the front side of cylinder 2.

On the other hand, inner periphery Ra of rear tubular part 2a of cylinder 2 is provided multiple streak grooves 25 inclined in a reverse direction to the direction of the spiral ridge of screw 1 so that said inner periphery is greatly coarsened. To make inner periphery Ra of said rear tubular part coarse, it can be simply knurled but, if the directivity of the grooves is determined as described, the material is favorably fed into the material flow passage.

Inner periphery Rb of intermediate part 2b of cylinder 2 can be slightly smoother than inner periphery Ra of said rear tubular part, for example, it can be coarsened surface with unevenness shallower than said thread groove 25 or a knurl.

The inner periphery of front tubular part 2c of cylinder 2 can be divided into part Rc1 nearest intermediate part 2b, part Rc3 nearest the extreme front end and intermediate part Rc2 between part Rc1 and part Rc3.

Part Rc1 is made to be slightly smoother (for example, the height of surface roughness is 560μ or less) than inner periphery Rb of said intermediate part, part Rc3 is made to be smoothest (for example, the height of surface roughness is 6μ or less) and middle part Rc2 is made to have an intermediate degree of smoothness (for example, the height of surface roughness is 25μ or less).

Accordingly, the surface roughness of the inner periphery of cylinder 2 becomes gradually finer from the rear side to the front side as shown with line l2 in FIG. 9.

Viewing the effects of the surface roughness of the inner periphery of cylinder 2 and the temperature difference of cylinder 2 and screw 1 on the feeding and kneading of the material, it is found that the coarser the surface roughness of the cylinder 2 compared to that of the outer periphery of screw 1, the stronger the adhering force of the material to cylinder 2 and the lower the temperature of screw 1 compared to that of cylinder 2, the relatively stronger the adhering force to cylinder 2 becomes.

Thus, the stronger the adhering force of the material to cylinder 2 is, the smoother the flow of material becomes along with rotation of screw 1.

Figure 11:
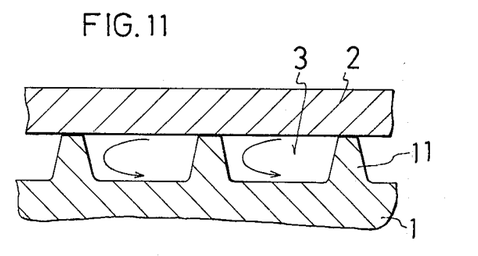
FIG. 11 is a view illustrating the material flow passage between the cylinder and the screw, showing the material being kneaded.

On the other hand, if the adhering force of the material to cylinder 2 is small, the material is not moved forward even by rotation of screw 1 whereas the material locally turns about in the material flow passage and is consequently kneaded by the spiral ridge as shown in FIG. 11.

The surface roughness of rear tubular part 2a of cylinder to which the material is supplied is coarsest and the temperature of screw 1 is extremely low as compared with that of the inner periphery of cylinder 2. Accordingly, since the adhering force of the material to the inner periphery of cylinder 2 in said rear tubular part is mechanically and thermally strong, the material is powerfully forwarded by screw 1 and thus smoothly moved.

On the other hand, the surface roughness of the inner periphery of front tubular part 2c of cylinder 2 is fine and the temperature of screw 1 is high. Accordingly, the adhering force of the material to the inner periphery of the cylinder is weak and the material feeding force is also weak but the material kneading force becomes strong.

Since the surface roughness of inner periphery Rc3 of the front tubular part, especially extreme front end 2c' of cylinder 2 is extremely fine and screw 1 is not almost cooled, the adhering force of the material to inner periphery Rc3 of cylinder 2 is extremely weak and the kneading effect of the material is extremely high. Therefore, the distribution of temperature in the extreme front end part of the material flow passage is uniform.

Figure 12:
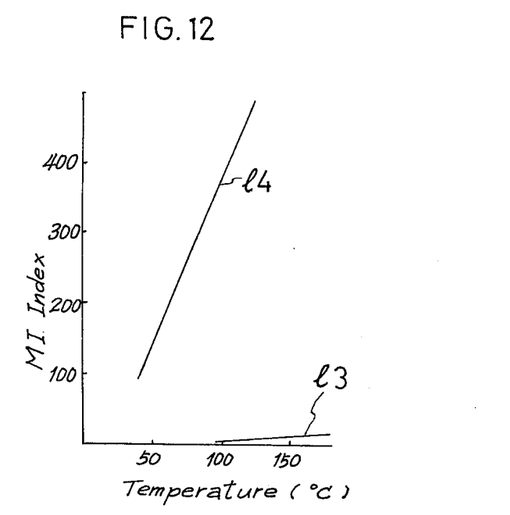
FIG. 12 is a graph indicating the relationship between the temperatures and MI indexes of the hot-melt material and other general thermoplastic synthetic resins.

The viscosity of the hot melt material suddenly changes in accordance with the variation of the temperature. That is, the MI index of general thermoplastic resins does not vary so greatly as variation of the temperature as shown with line l3 in FIG. 12 while the MI index of the hot melt material abruptly changes as shown with line l4. Accordingly, when extruding the hot melt material, the material flow becomes uneven if there is a difference in temperatures between screw 1 and cylinder 2 and the quality of extruded products is not uniform.

However, in the embodiment shown in FIG. 8, the temperature distribution near the extruding outlet is uniform and therefore the qualitative uniformity of the extruded material can be maintained.

Figure 10A:
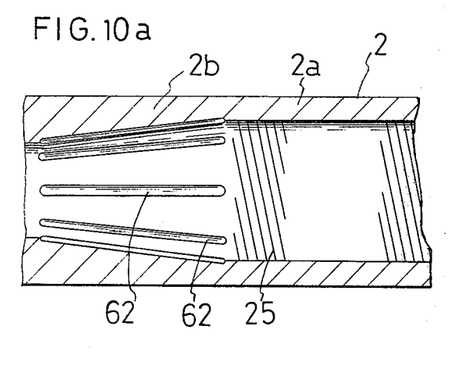
FIG. 10a is a magnified partial cross sectional view illustrating the cylinder of extruder shown in FIG. 7.
Figure 10B:
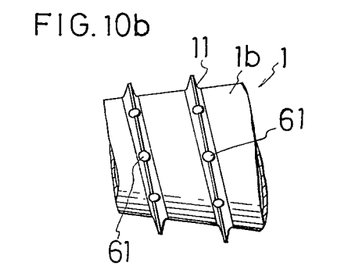
FIG. 10b is a magnified partial front view of the intermediate part of the screw of the extruder shown in FIG. 7, FIGS. 10c and 10d are cross sectional views illustrating the assembly of the cylinder shown in FIG. 10a and the screw shown in FIG. 10b.

The communicating path in intermediate passage throttle part 3b of the material flow passage is formed so that the inner periphery of intermediate part 2b of cylinder 2 is provided with at least one streak groove 62 along the axial direction and spiral ridge 11 is provided with at least one groove 61 as shown in FIGS. 10a and 10b. In this case, said both grooves 61 and 62 are preferably aligned when screw 1 is rotated by a specified angle.

Figure 10C:
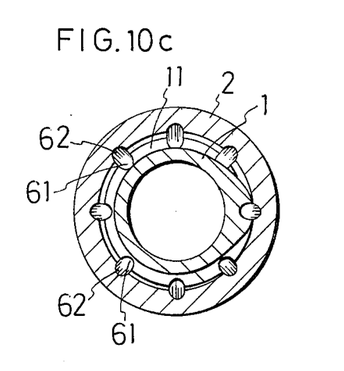
Figure 10D:
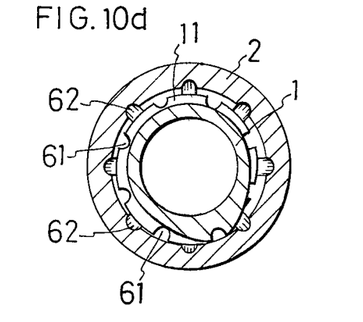

When the positions of both grooves 61 and 62 are aligned as shown in FIG. 10c, the material flow resistance of the communicating path is small and when the positions of the both grooves are not aligned as shown in FIG. 10d the material flow resistance of the entire communicating path is large.

When screw 1 rotates and both grooves 61 and 62 are alternately aligned and separated, the reverse flow effect of the fluid material in the communicating path is alternately increased and decreased and the material with air and volatile contents is reversed by the pumping effect.

When producing the hot melt material by the apparatus shown in FIG. 7, primary materials (resins, rubber, wax, stabilizer, extender, etc.) are mixed in advance by the intensive mixer, kneader or rolls and the mixed materials which are semi-fluid or completely fluid are fed into material supplying port of the extruder according to the present invention. Then, the fluid material is moved forwardly while being prevented from slipping by multiple streak groove 25 or the knurl on the inner periphery of rear tubular part 2a of cylinder 2 and is extruded from extruding outlet of the extruder through similar processes to the embodiment shown in FIG. 1. If the sheet dies or the strand dies are provided at extruding outlet 22, the hot melt material in a desired shape can be produced by using the cooling water basin and the cutter.

Figures 13, 14:
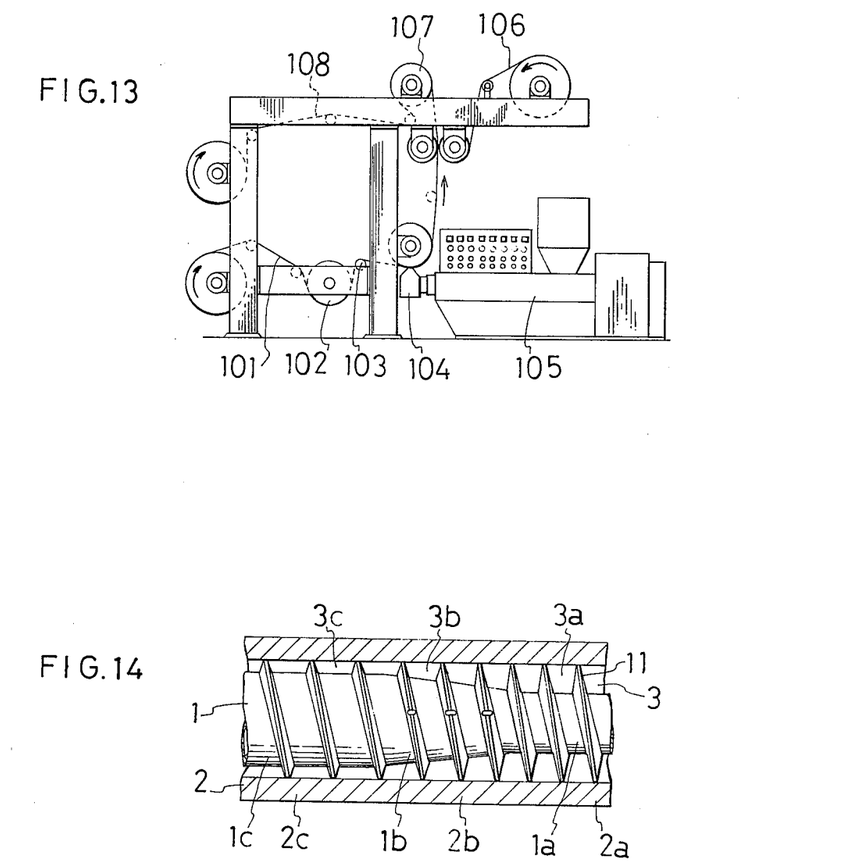

Furthermore, laminate coating can be easily performed by providing the faced-up fountain T dies at extruding outlet 22. FIG. 13 shows an example of the laminate coating process. Primary paper 101 is fed to fountain T dies 104 through preheating rolls 102 and expander rolls 103 and is coated with a hot melt bonding agent supplied from extruder 105 according to the present invention by fountain T dies 104, coated primary paper 101 is laminated with secondary paper 106, a laminated sheet is bonded by cooling through cooling rolls 107 and thus laminate sheet 108 is completed. In many cases, however, cooling rolls 107 are unnecessary.

Cylinder 2 and screw 1 can be formed as shown below, regardless of said embodiments.

Referring to FIG. 14, there is shown an embodiment of cylinder 2 in which the inside diameters from front tubular part 2c to rear tubular part 2a are equal anywhere therebetween. In this case, front part 1c of screw 1 is given a larger diameter, rear part 1a is given a smaller diameter and intermediate part 1b is tapered so that the capacity of material flow passage 3 per turn of the spiral ridge in front passage part 3c is smaller than that of rear passage part 3a and decreases gradually in intermediate passage throttle part 3b.

Figure 15:
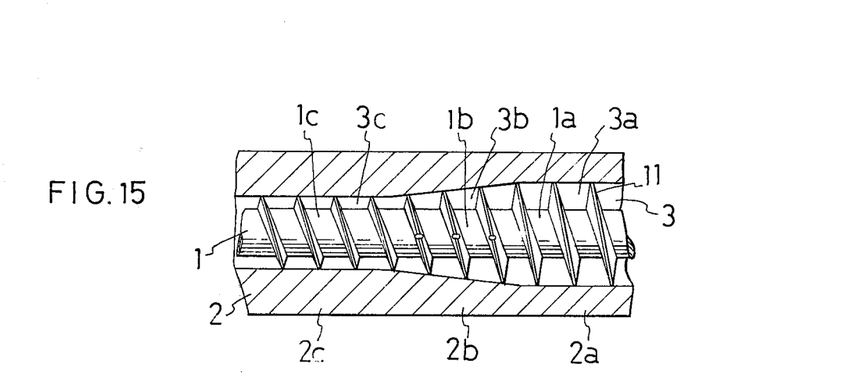

Referring to FIG. 15, there is shown an embodiment of screw 1 in which the outside diameters of the screw from front part 1c to rear part 1a are equal anywhere therebetween. In this case, cylinder 2 is tapered for the same purpose as above.

As described heretofore, the extruder according to the prevent invention is adapted to provide such advantages that the fluid material can be reversely moved through the communicating path to ensure high material kneading effect, a great quantity of extenders can be added to the material, the homogeneous quality of general materials to be extruded can be improved and uniformly colored products can be made using the master color batch of resins.

Moreover, the extruder according to the present invention is advantageous in that the extruding quantity of the material can be fixed by the communicating path, overload is avoided to prolong the service life of the extruder, and foams or volatile substance can be removed from the material since the communicating path serves to release them.

In addition, other advantages such as the edged top end of the rear part of the spiral ridge which makes mixing and kneading more efficient and effective are described in detail in respective embodiments in the foregoing paragraphs.

What is claimed is:
1. An extruder comprising:
 a. a cylinder which has a front tubular part, rear tubular part and an intermediate part between said front tubular part and said rear tubular part and is provided with a material supplying port for supplying a material at a periphery of said rear tubular part and a material extruding outlet at said front tubular part;
 b. pulverizing means positioned at said material supply port, which pulverizes primary materials and feeds pulverized materials under pressure into said material supplying port, said means for pulverizing and feeding the materials comprising rotary blades which are edged at the blade ends;
 c. a screw which is provided with a spiral ridge on its outer periphery, rotatably housed in said cylinder, said screw having a front part, rear part and intermediate part corresponding to the parts of said cylinder;
 d. a material flow passage spirally formed by said spiral ridge between the outer periphery of said screw and the inner periphery of said cylinder, said passage communicating with said material supplying port and said material extruding outlet and adapted so that a capacity per turn of the spiral ridge in a front part formed by the front parts of said cylinder and screw is smaller than that of a rear part formed by the rear parts of said cylinder and screw and a capacity per turn of the spiral ridge in a passage throttle part formed by the intermediate parts of said cylinder and screw gradually decreases as said spiral ridge advances from the rear side to the front side;
 e. a communicating path connecting adjacent partial sections of said material flow passage which are separated by said spiral ridge in said passage throttle part;
 f. a rotary driving means which rotates said screw; and
 g. a heating means provided on said cylinder to heat said material flow passage.

2. An extruder in accordance with claim 1, wherein an outermost end of said spiral ridge on the rear part of said screw is formed as a cutting edge.

3. An extruder in accordance with claim 1, wherein the surface roughness of the inner periphery of the rear tubular part of said cylinder is more coarse than that of the outer periphery of the rear part of said screw.

4. An extruder in accordance with claim 3, wherein a number of grooves which are inclined in an opposite direction to the inclination angle of said spiral ridge are provided to roughen the inner periphery of the rear tubular part of said cylinder.

5. An extruder in accordance with claim 1, wherein said communicating path is formed by a gap in said spiral ridge in a direction across the spiral ridge.

6. An extruder in accordance with claim 1, wherein said communicating path comprises grooves from the front side to the rear side on the inner periphery of the intermediate part of said cylinder.

7. An extruder in accordance with claim 1, wherein said communicating path comprises grooves formed by spaces in the sprial ridge in a direction across the spiral ridge and grooves formed by recessing the inner periphery of the intermediate part of the cylinder wherein the grooves on the spiral ridge and the grooves on the inner periphery of the cylinder are alternately aligned and not aligned when the screw is rotated.

8. An extruder in accordance with claim 1, wherein said cylinder is made so that an inside diameter of the front tubular part is smaller than that of the rear tubular part and the intermediate part is tapered and said screw is made so that an outside diameter of the front part is smaller than that of the rear part and the intermediate part is tapered, to internally fit said screw to said cylinder.

* * * * *